US012707013B2

(12) United States Patent
Agrawal et al.

(10) Patent No.: US 12,707,013 B2
(45) Date of Patent: Aug. 11, 2026

(54) SURFACING DYNAMIC CALL TRANSCRIPTS FOR A SECONDARY DISPLAY

(71) Applicant: MOTOROLA MOBILITY LLC, Wilmington, DE (US)

(72) Inventors: Amit Kumar Agrawal, Bangalore (IN); Krishnan Raghavan, Bangalore (IN); Nakul Patel, Nagpur (IN)

(73) Assignee: Motorola Mobility LLC, Chicago, IL (US)

( * ) Notice: Subject to any disclaimer, the term of this patent is extended or adjusted under 35 U.S.C. 154(b) by 115 days.

(21) Appl. No.: 18/930,050

(22) Filed: Oct. 29, 2024

(65) Prior Publication Data

US 2026/0122185 A1 Apr. 30, 2026

(51) Int. Cl.
*H04M 3/537* (2006.01)
*H04N 23/611* (2023.01)

(52) U.S. Cl.
CPC .......... *H04M 3/537* (2013.01); *H04N 23/611* (2023.01)

(58) Field of Classification Search
None
See application file for complete search history.

(56) References Cited

U.S. PATENT DOCUMENTS 8,913,116 B2 * 12/2014 Lowry ................ H04M 3/5175 348/77
2014/0376711 A1 * 12/2014 Thomson ............ H04M 3/5175 379/265.06

* cited by examiner

*Primary Examiner* — Quynh H Nguyen
(74) *Attorney, Agent, or Firm* — Isidore PLLC

(57) ABSTRACT

A method of enabling dynamic surfacing of transcripts of communication exchanges between first and second communicatively connected electronic communication devices. The method includes, during a communication exchange between the first and second electronic communication devices, determining whether a trusted person is detected within a threshold distance in proximity of a first display of the first electronic device. The method includes, in response to detecting a trusted person within the threshold distance, determining whether the trusted person is in an inquisitive mode relative to at least one of a user of the first electronic device and the communication exchange. The method includes, in response to determining that the trusted person is in an inquisitive mode, activating a transcript sharing mode of the first electronic device and starting surfacing of a transcript of an ongoing communication on the first display of the first electronic device.

20 Claims, 8 Drawing Sheets

100a
104
Front Display 184
Visual Content 189
202
212
100a
104
212
208
100a
187a
Transcript 190
187b
Transcript 190

100d
508
Back Display 187
Visual Content 189
502a
168
514

SURFACING DYNAMIC CALL TRANSCRIPTS FOR A SECONDARY DISPLAY

BACKGROUND

1. Technical Field

The present disclosure relates generally to electronic communication devices with a display, and more particularly to electronic communication devices which support audio/audiovisual communication and can present text on a display.

2. Description of the Related Art

Portable electronic communication devices, especially smartphones, are ubiquitous. Innovations in the shape and function of such devices continue to emerge. Recent developments have led to screens that can be expanded or retracted to cover more or less of the external surface of the device, paired with the ability to share data being streamed or otherwise exchanged. In certain configurations the entirety of the screen space may be dedicated to one image or stream. Other configurations divide the screen space into parts, each sharing part of the image or screen or each displaying separate media. Additionally, some devices provide both a front display and a rear display, each presenting separate content in opposed directions.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
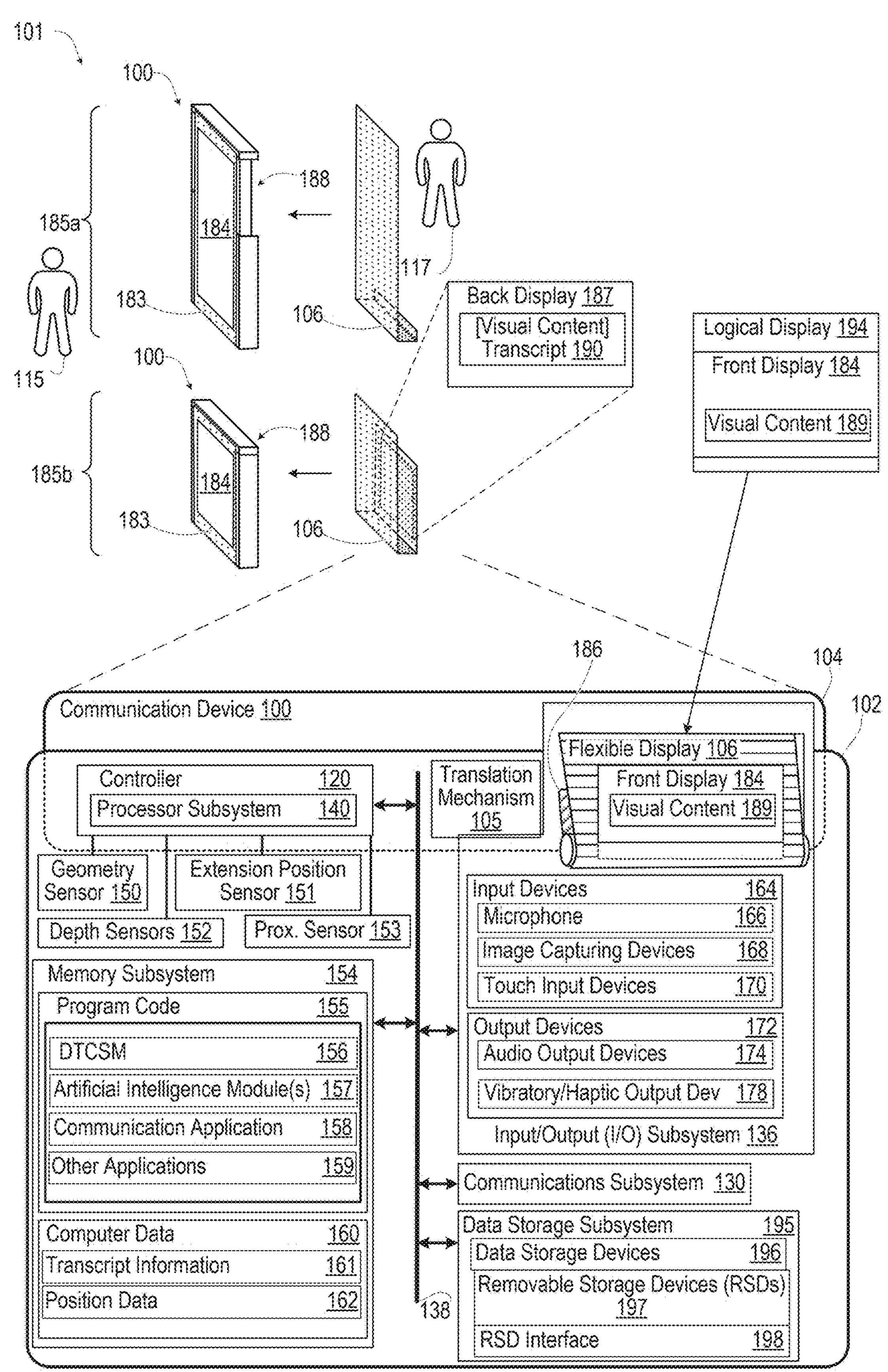
FIG. 1 presents a simplified functional block diagram along with three-dimensional views of a communication device having dynamic call transcript surfacing for a communication exchange presented on an extendable display, according to one or more embodiments.

According to aspects of the present disclosure, an electronic device, a method, and a computer program product enable dynamic surfacing of transcripts of a communication exchange between electronic devices. More specifically, a first electronic device in communication with a second, remote electronic device will surface all or part of an ongoing conversation at the discretion of the user of the first electronic device. This surfacing takes place after a third party has been detected by the first electronic device and verified to be a person previously designated as authorized to be privy to such conversations (i.e., a trusted person).

Situations often arise where a first user who is engaged in a phone conversation on his/her mobile phone, is approached by an inquisitive person, such as a spouse, who is not actively participating in the conversation but desirous of knowing to whom the user is speaking or what the user is talking about on the phone conversation. In such scenarios, the device user has a number of clumsy ways in which to respond. The first user may mute the ongoing conversation and inform the third party of who is calling and what is being discussed. The first user may ignore the third party. The first user, unsure of how to handle the interruption, may become distracted and thus be ineffective in continuing the conversation. None of these responses is ideal. Moreover, they involve an interruption of the ongoing communication or potential annoyance of the inquiring person, if ignored. The present innovation leverages an electronic communication device having a display screen exposed to the inquiring person to communicate textually the disposition of the first user and/or the source and subject of the conversation, without pulling the first user away from or otherwise interrupting the conversation.

According to one embodiment, the electronic device includes: an enclosure that includes a first surface and a second surface opposed to the first surface; a communications subsystem having a least one interface by which the electronic device communicatively connects via a wireless connection to a second electronic device to enable a user of the electronic device to engage in a communication exchange with a second user of the second electronic device; and at least one display including a first display incorporated into the first surface, and oriented to be outward facing, away from the user of the electronic device while the user is engaged in the communication exchange; at least one image capturing device having a field of view (FOV) encompassing a viewing range of the first display; a memory, having stored thereon a dynamic call transcript surfacing module (DCTSM) that can configure the electronic device to selectively generate and present call transcripts on the first display; and at least one processor communicatively coupled to the communication subsystem, the first display, the at least one image capturing device, and the memory. The at least one processor processes the program code of the DCTSM, and is configured to cause the electronic device to: during a communication exchange with a second device user, determine whether a trusted person is detected within a threshold distance in proximity of the first display of the electronic device; in response to detecting a trusted person within the threshold distance, determine whether the trusted person is in an inquisitive mode relative to at least one of a first user of the electronic device and the communication exchange; and in response to determining that the detected trusted person is within the threshold distance and in an inquisitive mode, activate a transcript sharing mode of the electronic device and start surfacing a transcript of an ongoing communication on the first display of the electronic device. The processor is further configured to cause the electronic device to: determine whether the first electronic device is operating in a private environment; and initiate the presenting of the transcript on the first display only if the first electronic device is operating in a private environment. In a further embodiment, in order to determine whether the electronic device is operating in a private environment, the processor is further configured to cause the electronic device to: capture, by the image capturing device, images of persons within the FOV, the FOV including an area within which faces of persons are visible in a viewable range of the first display; compare the images to stored images of trusted persons; and initiate a surfacing of the transcript only when every person identified within the viewable range is a trusted person.

In a further embodiment, wherein each trusted person is pre-designated as such via an assigned trusted contact stored with identifying information that includes at least an associated name and at least one identifying image. In at least one alternative embodiment, the electronic device additionally includes: a second display, incorporated into the second surface of the enclosure, and oriented towards the user of the first electronic device while the user is engaged in the communication exchange; a microphone that enables capture of audible input for the communication exchange; and an audio output system that enables receipt by the user of audio from the communication exchange. In a further embodiment, the electronic device additionally includes at least one depth sensor that enables detection of three dimensionality of an object whose image is captured within the FOV of the at least one image capturing device, the depth sensor being operative to check for depth using a hardware-based active depth perception sensing technology. The at least one processor analyzes data received from the at least one depth sensor to determine whether a preview image detected by the at least one image capturing device is a face of a physical person, where the at least one processor is configured to cause the electronic device to differentiate between a still image and an actual physical person facing the first display of the electronic device and to activate transcript sharing mode only in response to the detected object being an actual physical person.

In a further embodiment the processor is further configured to cause the electronic device to: present the transcript on the first display; and concurrently present the transcript on a first section of the second display along with a communication exchange user interface. In an alternative embodiment, the electronic device further includes a second display incorporated into the second surface facing the user, wherein the at least one processor is further configured to cause the electronic device to activate the transcript sharing mode by generating and presenting, via the second display, a selectable activation option for receiving user approval prior to the surfacing of the transcript on the first display. In at least one embodiment, the at least one processor is further configured to cause the electronic device to generate and present the transcript comprising a verbatim textual representation of words spoken by a user of the second electronic device during the communication exchange. In at least one embodiment the at least one processor is further configured to cause the electronic device to activate a dedicated artificial intelligence (AI) module that generates and presents the transcript comprising a summary, generated by the AI module, of a context associated with words spoken by both a user of the second electronic device and the user of the electronic device during the communication exchange.

Additionally, according to one aspect of the disclosure, a method for surfacing dynamic call transcripts for an ongoing communication exchange is disclosed. The method includes: during a communication exchange between a first electronic device and a communicatively connected second electronic device, determining whether a trusted person is detected within a threshold distance in proximity of a first display of the first electronic device; in response to detecting a trusted person within the threshold distance, determining whether the trusted person is in an inquisitive mode relative to at least one of a first user of the electronic device and the communication exchange; and in response to determining that the trusted person is in an inquisitive mode, activating a transcript sharing mode of the electronic device and starting surfacing of a transcript of an ongoing communication on the first display of the electronic device.

Also disclosed is a computer program product comprising a non-transitory computer readable medium operative to implement dynamic surfacing of call transcripts for an ongoing communication. The computer program product has program instructions that when executed by a processor of an electronic device that comprises a processor communicatively coupled to at least a communication subsystem, a first display, an image capturing device, and a memory, configure the electronic device to perform the above-presented and other method functions.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined at least by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural, functional, or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest reasonable interpretation given the context in which that term is utilized.

As further described below, implementation of the functional features of the disclosure described herein is provided within processing devices and/or structures and can involve use of a combination of hardware, firmware, and several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative, highlighting essential components that are utilized to implement aspects of the described embodiments. For example, other devices/components may be used in addition to or in place of the hardware and/or firmware depicted. The depicted examples are not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device having an extendable design form, in which the features of the present disclosure are advantageously implemented for supporting dynamic call transcript surfacing for a communication exchange on an adaptable display. In one or more embodiments, the electronic device includes additional communications functionality as electronic device 100 to operate as a mobile user device and as a communication device in communication environment 101. Electronic device 100 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Electronic device 100 includes base housing 102 having a front side and a back side. Flexible display support structure 104 is moveably attached to and positionable on base housing 102 between a retracted position and an extended position relative to base housing 102. In one or more embodiments, translation mechanism 105 moves flexible display support structure 104 relative to base housing 102. Flexible display 106 is coupled across at least a front face of base housing 102 and flexible display support structure 104. Electronic device 100 presents a larger portion of flexible display 106 while flexible display support structure 104 is in the extended position and presents a smaller portion of flexible display 106 while flexible display support structure 104 is in the retracted position.

In addition to controller 120, communication device 100 may include communications subsystem 130, memory subsystem 154, data storage subsystem 195 and input/output (I/O) subsystem 136. To enable management by controller 120, system interlink 138 communicatively connects controller 120 with communications subsystem 130, memory subsystem 154, data storage subsystem 195 and I/O subsystem 136. System interlink 138 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections, including one or more intermediate electrical components. Although certain direct interconnections (i.e., system interlink 138) are illustrated in FIG. 1, it is to be understood that more, fewer, or different interconnections may be present in other embodiments.

Controller 120 includes processor subsystem 140, which includes one or more central processing units (CPUs) or data processors. Processor subsystem 140 can include one or more digital signal processors that can be integrated with data processor(s). Processor subsystem 140 can include other processors such as auxiliary processor(s) that may act as a low power consumption, always-on sensor hub for physical sensors. Controller 120 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic. Memory subsystem 154 stores program code 155 for execution by processor subsystem 140 to provide the functionality described herein. Program code 155 includes applications such as communication application 158 that generates or facilitates incoming or outgoing calls and data/text transmissions. Program code 155 also includes dynamic call transcript surfacing module (DCTSM) 156, artificial intelligence module(s) 157, and other applications 159. DCTSM 156 can include program instructions for implementing the disclosed embodiments. DCTSM 156 can include instructions that cause or configure controller (processor) 120 to determine whether a trusted person (e.g. trusted third party) 117 is detected within a configurable threshold distance in proximity of the first display of the electronic device 100, during a communication exchange. The controller 120, in response to detecting a trusted person within the threshold distance, causes the electronic device 100 to determine whether the trusted person is in an inquisitive mode (as discussed in greater detail in the description accompanying FIG. 5) relative to at least one of a first user 115 of the electronic device 100 and the communication exchange. The controller 120, in response to determining that the detected trusted person is within the threshold distance and in an inquisitive mode, causes the electronic device 100 to activate a transcript sharing mode of the electronic device and start surfacing a transcript 190 of an ongoing communication on the first display of the electronic device. The processor is further configured to determine whether the first electronic device is operating in a private environment, and to initiate the presenting of the transcript 190 on the first display only if the first electronic device is in fact operating in a private environment. In one or more embodiments, to determine whether the electronic device is operating in a private environment, the processor may cause the electronic device to capture, by the image capturing device, images of persons within the field of FOV of the first display, the FOV including an area within which faces of persons are visible in a viewable range of the first display, compare the images to stored images of trusted persons, and initiate a surfacing of the transcript 190 only when every person identified within the viewable range is a trusted person. The processor may be further configured to present the transcript 190 on the first display, and concurrently present a transcript 190 of a communication exchange on a first section of the second display along with a communication exchange user interface. The processor may be further configured to cause the electronic device to generate and present the transcript 190 comprising a verbatim textual representation of words spoken by a user of the second electronic device during the communication exchange. The processor 120 may be further configured to cause the electronic device to activate a dedicated artificial intelligence (AI) module that generates and presents the transcript 190, which includes a summary, generated by the AI module 157, of a context associated with words spoken by both a user of the second electronic device and the user 115 of the electronic device 100 during the communication exchange.

The above applications may be software or firmware that, when executed by controller 120, configures communication device 100 to provide functionality described herein. In one or more embodiments, several of the described aspects of the present disclosure are provided via executable program code of applications executed by controller 120. In one or more embodiments, program code 155 may be integrated into a distinct chipset or hardware module as firmware that operates separately from executable program code. Portions of program code 155 may be incorporated into different hardware components that operate in a distributed or collaborative manner. Memory subsystem 154 further includes operating system (OS), firmware interface, such as basic input/output system (BIOS) or Uniform Extensible Firmware Interface (UEFI), and firmware, which also includes and may thus be considered as program code 155.

Program code 142 may access, use, generate, modify, store, or communicate computer data 160, such as transcript information 161 and position data 162. Computer data 160 may incorporate "data" that originated as raw, real-world "analog" information that consists of basic facts and figures. Computer data 160 includes different forms of data, such as numerical data, images, coding, and notes. Computer data 160 may originate at communication device 100 or be retrieved from a remote device via communications subsystem 130. Communication device 100 may store, modify, present, or transmit computer data 160 such as transcript information 161 and position data 162 that is specific to the flexible display support structure 104. Computer data 160 may be organized in one of a number of different data structures. Common examples of computer data 160 include video, graphics, text, and images. Computer data 160 can also be in other forms of flat files, databases, and other data structures.

Data storage subsystem 195 of communication device 100 includes data storage device(s) 196. Controller 120 is communicatively connected, via system interlink 138, to data storage device(s) 196. Data storage subsystem 195 provides program code 155 and computer data 160 stored on non-volatile storage that is accessible by controller 120. For example, data storage subsystem 195 can provide a selection of program code 155 and computer data 160. These applications can be loaded into memory subsystem 154 for execution/processing by controller 120. In one or more embodiments, data storage device(s) 196 can include hard disk drives (HDDs), optical disk drives, and/or solid-state drives (SSDs), etc. Data storage subsystem 195 of communication device 100 can include removable storage device(s) (RSD(s)) 197, which are received in RSD interface 198. Controller 120 is communicatively connected to RSD 197, via system interlink 138 and RSD interface 198. In one or more embodiments, RSD 197 is a non-transitory computer program product or computer readable storage device that incudes program instructions, which may be executed by a processor associated with a user device such as communication device 100. Controller 120 can access data storage device(s) 196 or RSD 197 to provision communication device 100 with program code 155 and computer data 160.

I/O subsystem 136 may include input devices 164 such as microphone 166, image capturing devices 168, and touch input devices 170 (e.g., screens, keys or buttons). I/O subsystem 136 may include output devices 172 such as flexible display 106, audio output devices/audio output system 174 (e.g. a speaker or a Bluetooth® transmitter paired to a headset or earphones), and vibratory or haptic output devices 178.

In one or more embodiments, controller 120, via communications subsystem 130, performs multiple types of over-the-air (OTA) or wireless communication, such as by using a Bluetooth® connection or other personal access network (PAN) connection. In an example, a user may wear a health monitoring device such as a smartwatch that is communicatively coupled via a wireless connection. In one or more embodiments, communications subsystem 130 includes a global positioning system (GPS) module that receives GPS broadcasts from GPS satellites to obtain geospatial location information. In one or more embodiments, controller 120, via communications subsystem 130, communicates via a wireless local area network (WLAN) link using one or more IEEE 802.11 WLAN protocols with an access point. In one or more embodiments, controller 120, via communications subsystem 130, may communicate via an OTA cellular connection with radio access networks (RANs). In an example, communication device 100, via communications subsystem 130, connects via RANs of a terrestrial network that is communicatively connected to a network server.

Controller 120 may be directly communicatively coupled, or indirectly communicatively coupled via system interlink 138 or a support processor, to one or more physical sensors. In an example, physical sensors may include geometry sensor 150 configured to detect a particular geometry, geometric form factor, or deformation state of the electronic device 100. The geometry sensor 150 could, for example, detect a geometric form factor containing multiple image capturing devices 168 on a side of the device housing in the event that the device housing was foldable or rollable with both a primary display and a secondary display. Geometry sensors 150 comprise passive resistive devices manufactured from a material with an impedance that changes when the material is bent, deformed, or flexed. Physical sensors may include extension position sensor 151 configured to detect a specific retracted, intermediate, or extended position of flexible display support structure 104 between fully retracted and fully extended positions. Physical sensors may include depth sensor 152 configured to enable detection of three dimensionality of an object whose image is captured within the FOV of the at least one image capturing device 168. Physical sensors may also include a proximity sensor 153.

Controller 120 may include various functionality that enables controller 120 to perform different aspects of one or more artificial intelligence (AI) module(s) 157 for computation tasks. AI modules 157 may include an artificial neural network, a decision tree, a support vector machine, Hidden Markov model, linear regression, logistic regression, Bayesian networks, and so forth. The AI module(s) 157 can be individually trained to perform specific tasks and can be arranged in different sets of AI module(s) 157 to generate different types of output. For example, an AI module 157 can be configured to enable detection of facial expressions of third parties and to produce verbatim transcripts and/or summaries of communication exchanges.

In one or more embodiments, flexible display 106 is coupled to flexible display support structure 104 across front side 183 of first housing 102 to present a larger portion of flexible display 106 as front display 184 on front side 183, while flexible display support structure 104 is in the extended position as depicted to the right of bracket **185*a*. A smaller portion of flexible display 106 is presented as front display 184 on front side 183, while flexible display support structure 104 is in the retracted position, as depicted to the right of bracket 185*b*. While flexible display support structure 104 is in the retracted position, remaining portion 186 of flexible display 106 is one of: (i) scrolled up inside of first housing 102 as described below with regard to FIGS. 2A-2F and; or (ii) rolled back providing back display 187 on back side 188 of first housing 102. A first example of a "rollable extendable display" is described below with regards to FIGS. 3A-3F. A second example of a "rollable extendable display" is described below with regards to FIGS. 4A-4F. For embodiments that roll, the flexible display 106, front display 184 and back display 187 may be individually inactive or may be individually active to present visual content 189. For each implementation of an extendable display, translation mechanism 105 is operable to position flexible display support structure 104 between the retracted position and the extended position. Position sensor 151 is configured to detect a position of flexible display support structure 104 relative to first housing 102. Controller 120 is communicatively coupled to translation mechanism 105, flexible display 106, and position sensor 151 to determine retracted and extended dimensions of front display 184 based on position sensor 151**.

Controller 120 presents visual content 189 on flexible display 106. During a communication exchange between a first electronic device 100 and a communicatively connected second electronic device, in response to detecting a trusted person 117 within a threshold distance, the controller 120 determines whether the trusted person is in an inquisitive mode relative to at least one of the first user 115 of the electronic device 100 and the communication exchange. In response to determining that the trusted person 117 is in an inquisitive mode, the controller 120 activates a transcript sharing mode of the electronic device 100 and starts surfacing a transcript 190 of the ongoing communication on the display of the electronic device 100 directed toward the trusted person 117, namely the back display 187. According to some embodiments, electronic device 100 need not have a front display 184; however, when provided, a front display 184 would be directed towards the user of the electronic device 100.

In one or more embodiments, controller 120 manages dimensions of logical display 194 for placement of visual content 189 with one or more areas assigned to be front display 184. Different applications or functions may be given different areas that are adjacent or that can be logically stacked in a selectable window hierarchy. Generally, assigned dimensions of the one or more areas are responsive to the position of the flexible display support structure 104. One or more of the areas are resized or omitted to fit within the available front portion of flexible display 106. Generally, all of the available front portion of flexible display 106 is utilized for presenting visual content. For embodiments capable of presenting both front display 184 and back display 187, all or part of a transcript 190 of a communication exchange may appear on the back display 187 or on both the front display 184 and the back display 187. In one or more embodiments, positioning of flexible display support structure 104 is responsive to an intended size, resolution, or aspect ratio of visual content 189 (e.g. transcript 190). In one or more embodiments, positioning of flexible display support structure 104 is responsive to a requirement to concurrently present visual content 189 on both front and back displays 184 and 187. Since the flexible display 106 physically changes orientation by 180 degrees when rolling from front side to back side of the communication device 100, visual content 189 presented in back display 187 is rotated 180 degrees in logical display 194 so that the physical orientation when viewed by a user has the same orientation as front display 184.

For clarity, communication device 100 is depicted as having an extendable display that translates on one side. Aspects of the present disclosure may be implemented in a communication device that extends on both opposite sides. Aspects of the present disclosure may be implemented in a foldable design form such as a vertically flipping orientation or laterally opening book fold provided by two housings coupled along adjacent sides by a pivoting hinge. In an example, a single flexible display may span across both housings and extend on one or both outer edges to each side of the hinge. In another example, each housing may support an individual flexible display that may extend on the outer edge opposite to the hinge or one or both of the edges, orthogonal to the hinge.

Figures 2A, 2B, 2C:
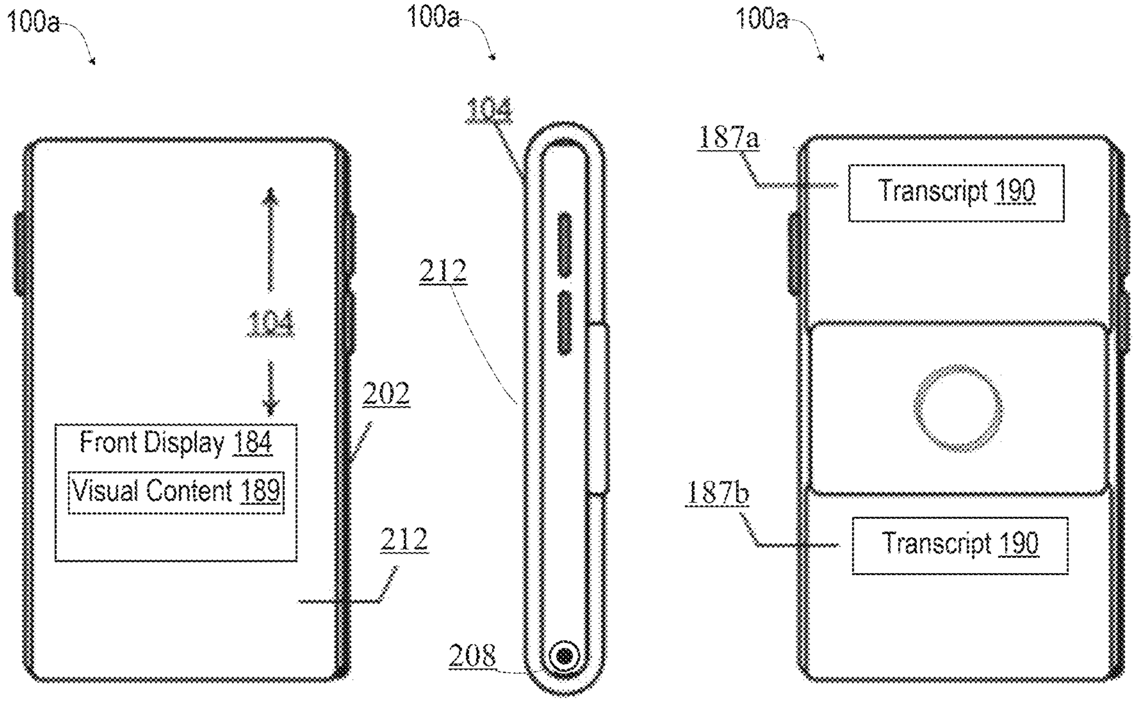
FIG. 2A is a front view of an example communication device as described in FIG. 1 having a flexible display support structure implemented as a telescoping housing that is in a retracted position supporting a flexible display having a main front portion and a remaining portion that scrolls, according to one or more embodiments.
FIG. 2B is a left side view of the example communication device of FIG. 2A having the telescoping housing in the retracted position, according to one or more embodiments.
FIG. 2C is a back view of the example communication device of FIG. 2A having the telescoping housing in the retracted position, according to one or more embodiments.

FIG. 2A is a front view of an example communication device 100*a* having base housing 202 coupled to flexible display support structure 104 (FIG. 1) with flexible display 206 configured to wrap around both ends of communication device 100*a*. FIG. 2A shows a configuration in which the flexible display 206 covers the front side 212 of the communication device 100*a*. In this configuration, a portion of flexible display 206 is occupied by front display 184, which displays visual content 189 of a user interface, such as a communication window. FIG. 2B is a left side view of the example communication device 100*a*. FIG. 2B, like FIG. 2A, shows a configuration of communication device 100*a* where the flexible display 106 covers front side 212 and has not rotated around housing 202 to cover back side 214. FIG. 2C is a back view of the example communication device 100*a* of FIG. 2A where a first portion of the flexible display 206 extends around a top edge of housing 202, forming a first rear-facing portion 187*a* of the back display 187. A second portion of flexible display 106 extends around the bottom edge of housing 202, forming a second rear-facing portion 187*b* of the back display 187. Back display 187 displays transcript 190 as visual content that is visible to a person within viewing range. Specific considerations for and adjustments in size of the font of presented transcript 190 can be made based on a distance of the inquisitive trusted person to the device 100*a* or back display 187. In the embodiments described above, the user 115 faces front display 184 while at least one image capturing device 168 having a field of view (FOV) encompassing a viewing range of the back display 187 detects the presence of inquisitive trusted person 117, and the transcript 190 is presented as visual content on the back display 187. However, alternate embodiments are contemplated where the user 115 faces back display 187 while at least one image capturing device 168 having a field of view (FOV) encompassing a viewing range of the front display 184 detects the presence of inquisitive trusted person 117. With these alternate embodiments, the transcript 190 is presented as visual content on the front display 184.

A communication exchange between communication device 100*a* and a second communication device can occur no matter the configuration of communication device 100*a*. If transcript sharing mode is activated while flexible display 206 covers front side 212, the controller 120 causes the translation mechanism 105 (FIG. 1) to extend flexible display 206 around housing 202. This results in the upper part of back side 214 being covered by a first rear-facing portion 187*a* of the back display 187 or the lower part of back side 214 being covered by a second rear-facing portion 187*b* of the back display 187. One or both portions of back display (187*a* and/or 187*b*) may be utilized to display a transcript 190 of the communication exchanges as visual content 189, specifically text reflecting the words spoken in the communication exchange.

Figures 3A, 3B, 3C:
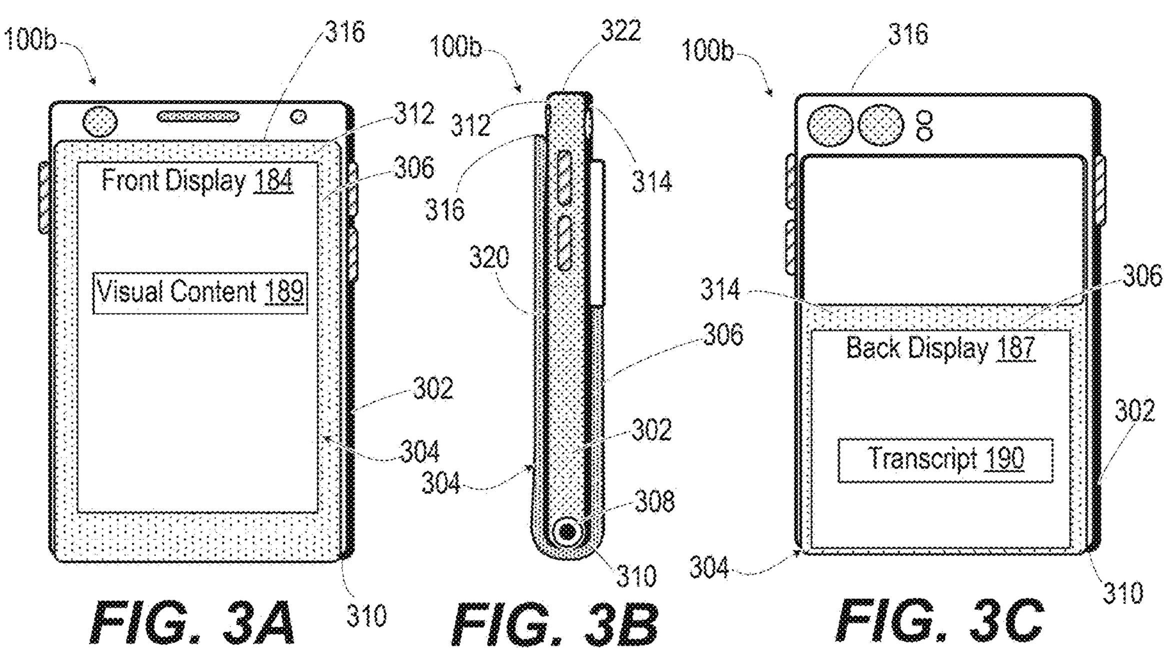
FIG. 3A is a front view of a second example communication device as described in FIG. 1 having a flexible display support structure implemented as a blade assembly that is in a retracted position, according to one or more embodiments.
FIG. 3B is a left side view of the second example communication device of FIG. 3A having the blade assembly in the retracted position, according to one or more embodiments.
FIG. 3C is a back view of the second example communication device of FIG. 3A having the blade assembly in the retracted position, according to one or more embodiments.

FIG. 3A is a front view of a second example communication device 100*b* having base housing 302 and having flexible display support structure 104 (FIG. 1) implemented as blade assembly 304 that positions flexible display 306 in a retracted position relative to base housing 302. FIG. 3B is a left side view of second example communication device 100*b* having blade assembly 304 in the retracted position. Display roller 308 is positioned at and aligned with first housing edge 310, which is at the bottom, as depicted, of base housing 302 between front side 312 and back side 314 and opposite to distal edge 316 of blade assembly 304. FIG. 3C is a back view of second example communication device 100*b* having blade assembly 304 in the retracted position. With particular reference to FIG. 3B-3C, a larger portion of flexible display 306 is rolled onto back side 314 of communication device 100*b*.

Figures 3D, 3E, 3F:
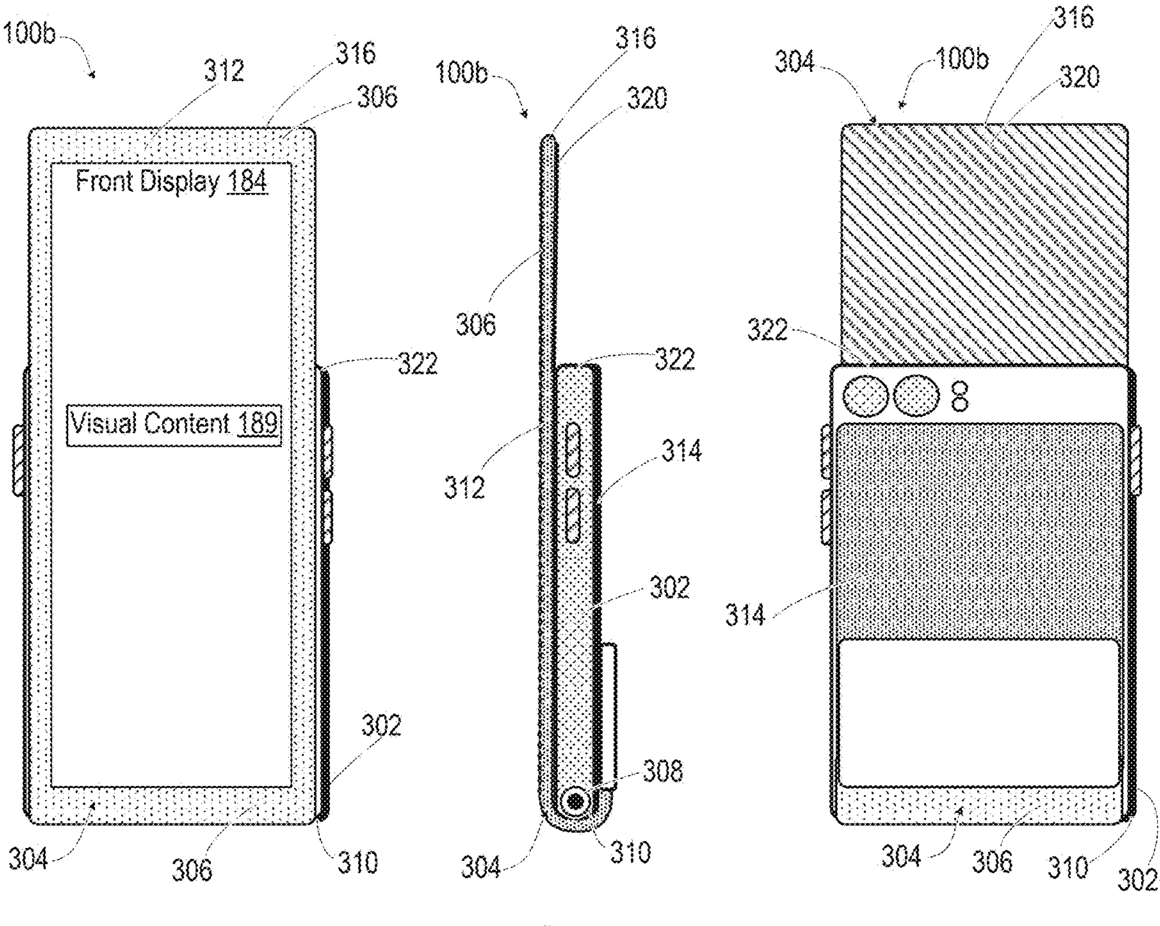
FIG. 3D is a front view of the second example communication device of FIG. 3A with the blade assembly in an extended position, according to one or more embodiments.
FIG. 3E is a left side view of the second example communication device of FIG. 3A having the blade assembly in the extended position, according to one or more embodiments.
FIG. 3F is a back view of the second example communication device of FIG. 3A having the blade assembly in the extended position, according to one or more embodiments.

FIG. 3D is a front view of second example communication device 100*b* with blade assembly 304 in an extended position. FIG. 3E is a left side view of second example communication device 100*b* having blade assembly 304 in the extended position. FIG. 3F is a back view of second example communication device 100*b* having blade assembly 304 in the extended position. With particular reference to FIG. 3E-3F, blade assembly 304 includes blade substrate 320 that is slidably coupled to base housing 302. Flexible display 306 is attached to blade substrate 320. Blade substrate 320 has a rigid portion positionable between a retracted position aligned with front side 312 of base housing 302 (FIGS. 3A-3C) and an extended position extending beyond second housing edge 322 opposite of first housing edge 310. Blade substrate 320 includes a flexible portion that contacts display roller 308 between the retracted position and the extended position to move a portion of blade assembly 304 between front side 312 and back side 314. Translation mechanism 105 (FIG. 1) may be implemented as an electric motor that operates by rotating display roller 308 (FIGS. 3B and 3E) that is engaged to blade substrate 320 to slide blade assembly 304 relative to base housing 302 between a fully retracted position and a fully extended position. Alternatively, translation mechanism 105 (FIG. 1) may be implemented as an electric motor that operates by sliding blade assembly 304 that is guided by display roller 308 that is passively positioned.

The size of front display 184 varies between FIGS. 3A and 3D in relation to the size of flexible display 306 on front side 312 of communication device 100*b*. The space available to display content on flexible display 306 when the blade assembly 304 is in the retracted position (FIG. 3A) is less than the space available to display content on flexible display 306 when the blade assembly 304 is in the extended position (FIG. 3D), in proportion to the difference between the respective lengths of the fully extended and fully retracted versions of the blade assembly 304. With reference to FIG. 3C, the presence and size of back display 187 is related to the available size of a back portion of flexible display 106 in the retracted position. In FIG. 3F, display is fully extended in the front of device and so no back display portion (187) is provided on back side 314. In the retracted position (FIG. 3C) flexible display 306 extends significantly up on back side 314.

A communication exchange between communication device 100*b* and a second communication device can occur when the blade assembly 304 of communication device 100*b* is in the retracted position (FIGS. 3A-3C) or in the extended position (FIGS. 3D-3F). If transcript sharing mode is activated while the blade assembly 304 is in the extended position, the controller 120 causes the translation mechanism 105 to rotate the display roller 308 to retract sliding blade assembly 304 to the retracted position. In the retracted position, a transcript 190 of the communication exchanges appears in back display 187 as visual content 189, specifically text reflecting the words spoken in the communication exchange.

Figures 4A, 4B, 4C:
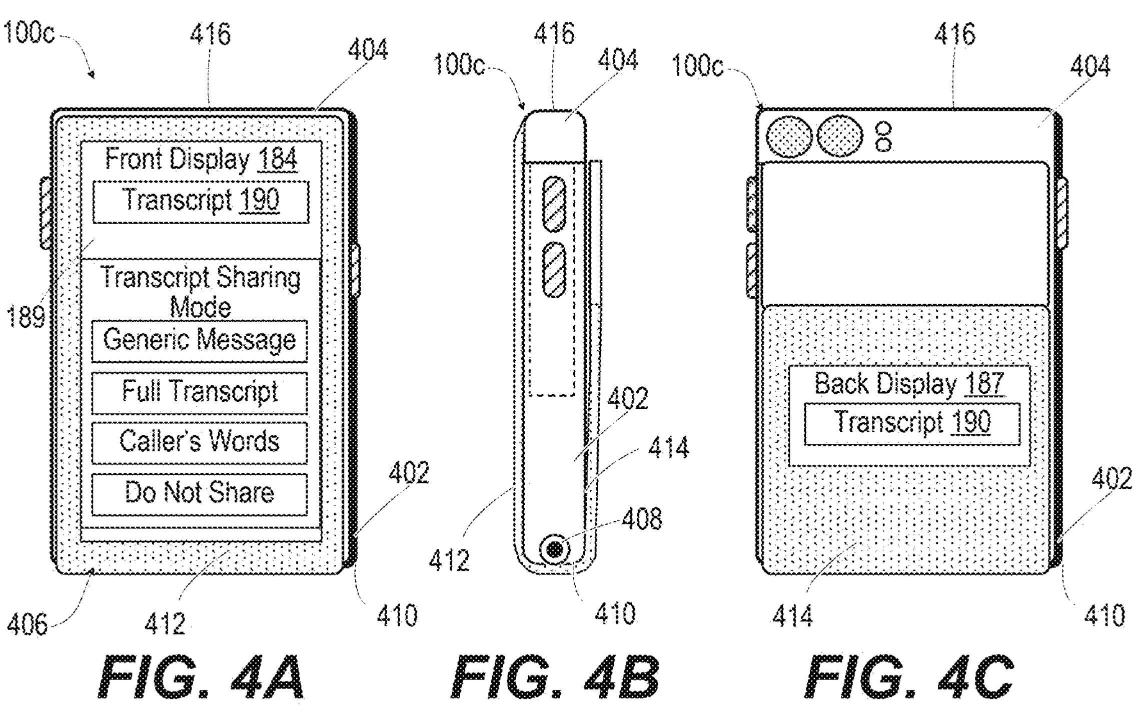
FIG. 4A is a front view of a third example communication device as described in FIG. 1 having a flexible display support structure implemented as a telescoping housing that is in a retracted position supporting a flexible display having a remaining portion that rolls onto a back of a base housing, according to one or more embodiments.
FIG. 4B is a left side view of the third example communication device of FIG. 4A having the telescoping housing in the retracted position, according to one or more embodiments.
FIG. 4C is a back view of the third example communication device of FIG. 4A having the telescoping housing in the retracted position, according to one or more embodiments.
Figures 4D, 4E, 4F:
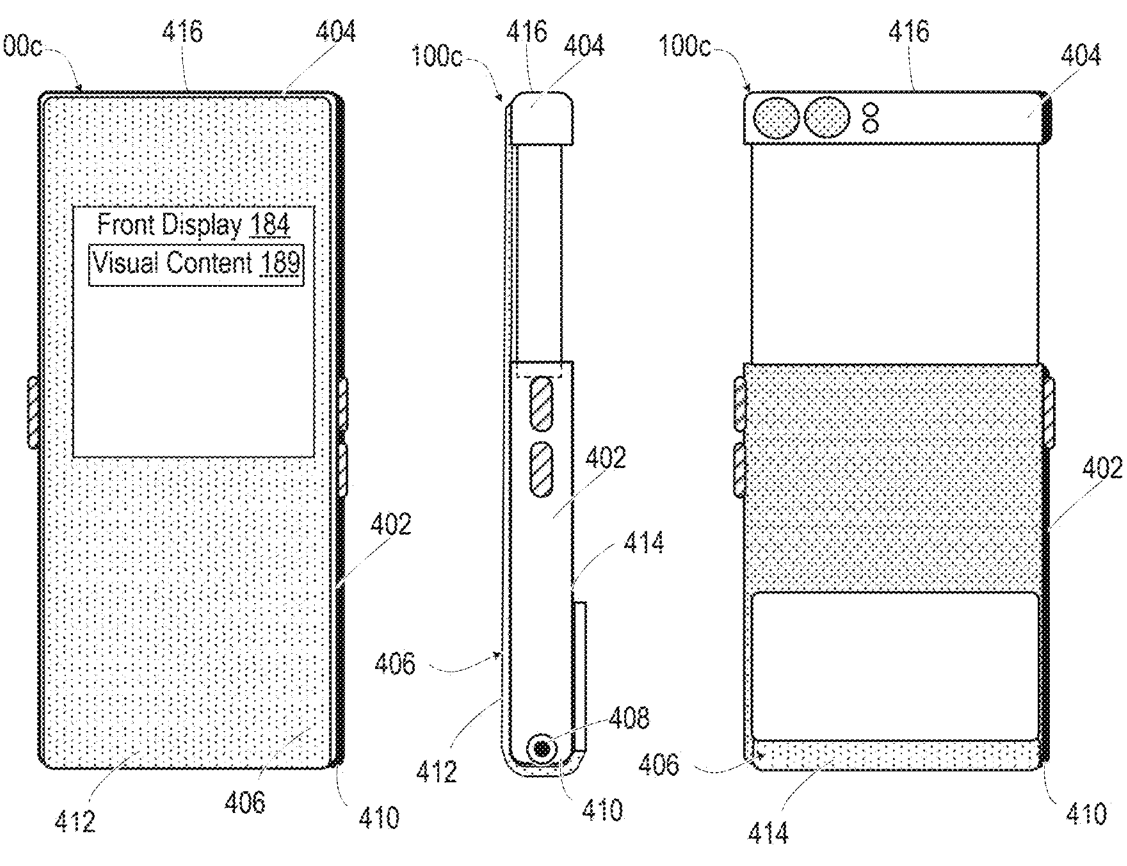
FIG. 4D is a front view of the third example communication device of FIG. 4A with the telescoping housing in an extended position, according to one or more embodiments.
FIG. 4E is a left side view of the third example communication device of FIG. 4A having the telescoping housing in the extended position, according to one or more embodiments.
FIG. 4F is a back view of the third example communication device of FIG. 4A having the telescoping housing in the extended position, according to one or more embodiments.

FIG. 4A is a front view of third example communication device 100*c* having base housing 402 coupled to flexible display support structure 104 (FIG. 1) that is implemented as telescoping housing 404, which is in a retracted position. Flexible display 406 extends across front side 412 of base housing 402 and telescoping housing 404. FIG. 4B is a left side view of third example communication device 100*c* having telescoping housing 404 in the retracted position. Display roller 408 is positioned at and aligned with first housing edge 410, which is at the bottom, as depicted, of base housing 402 between front side 412 and back side 414 and opposite of distal edge 416 of telescoping housing 404. Flexible display 406 contacts display roller 408 between the retracted position and the extended position to move a portion of flexible display 406 between front side 412 and back side 414. FIG. 4C is a back view of third example communication device 100*c* having telescoping housing 404 in the retracted position. FIG. 4D is a front view of third example communication device 100*c* with telescoping housing 404 in an extended position. FIG. 4E is a left side view of third example communication device 100*c* having telescoping housing 404 in the extended position. FIG. 4F is a back view of third example communication device 100*c* having the telescoping housing in the extended position. Translation mechanism 105 (FIG. 1) may be implemented as an electric motor that operates by rotating display roller 408 (FIGS. 4B and 4E) that is engaged to flexible display 406 to translate flexible display 406 relative to base housing 402 between a fully retracted position and a fully extended position. Alternatively, translation mechanism 105 (FIG. 1) may be implemented as an electric motor that operates by moving flexible display 406 that is guided by display roller 408, which is passively positioned.

A communication exchange between communication device 100*c* and a second communication device can occur when the telescoping housing 404 of communication device 100*c* is in the retracted position (FIGS. 4A-4C) or in the extended position (FIGS. 4D-4F). If transcript sharing mode is activated while the telescopic housing 404 is in the extended position, the controller 120 causes the translation mechanism 105 to rotate the display roller 408 to retract telescopic housing 404 to the retracted position. In the retracted position, a transcript 190 of the communication exchanges appears in back display 187 as visual content 189, specifically text reflecting the words or a summary of the words spoken in the communication exchange.

According to some embodiments, visual content 189, which is rendered on the front display 184 concurrently with transcript 190 being rendered on back display 187 in transcript sharing mode, may include a copy of transcript 190 in addition to the user interface for the communication exchange (as detailed further in the description of FIG. 7).

Figures 5A, 5B, 5C:
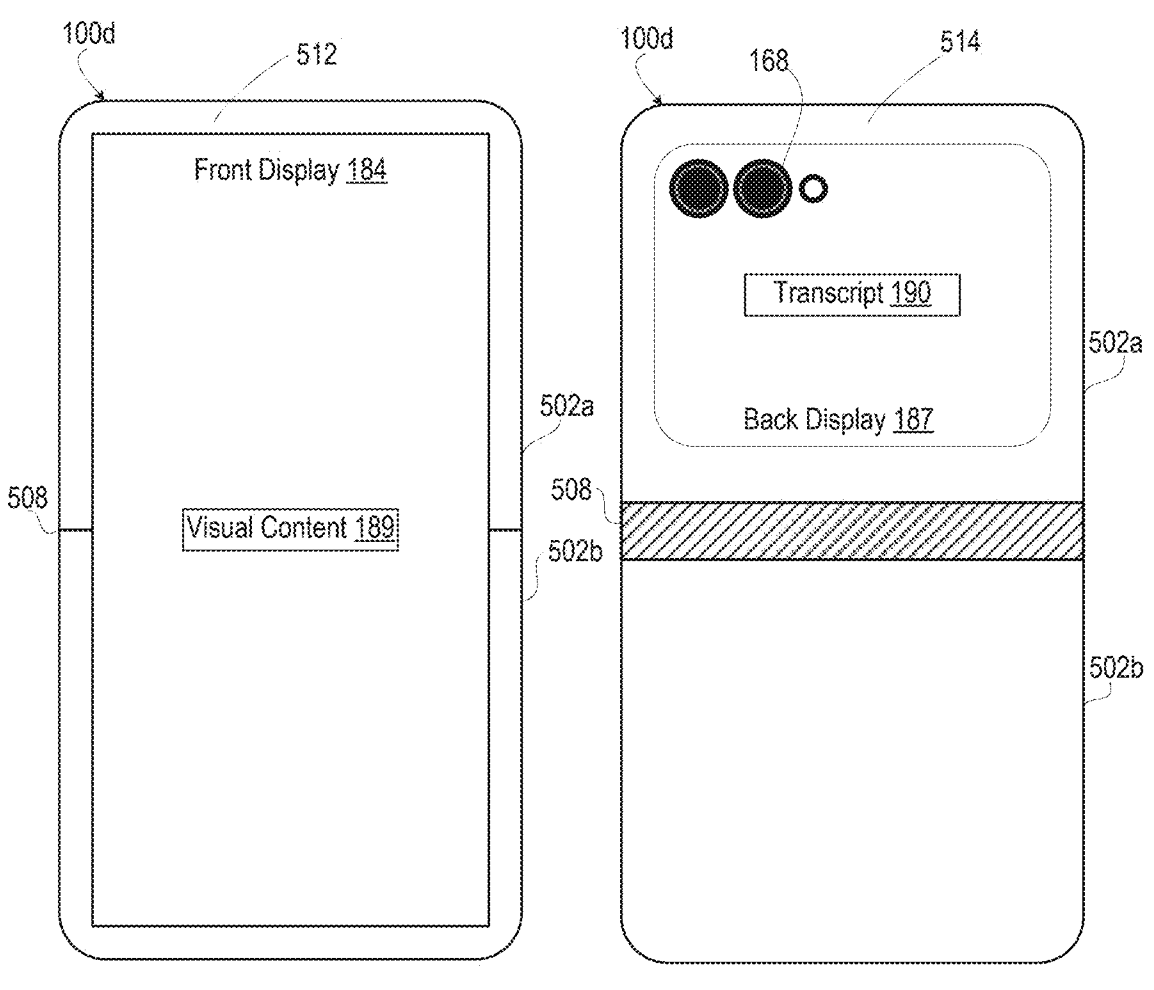
FIG. 5A is a front view of an example communication device 100*d* having a rigid display support structure implemented as a folding housing that is in an open position, according to one or more embodiments.
FIG. 5B is a rear view of the device of FIG. 5A, having the folding housing in the open position, according to one or more embodiments.
FIG. 5C is a front view of the device described in FIG. 5A, having the folding housing in the closed position, according to one or more embodiments.

FIG. 5A is a front view of an example communication device 100*d*, having a rigid display support structure implemented as a folding housing (502*a*, 502*b*) that is in an open position, according to one or more embodiments. Communication device 100*d* can be internally identical to the device described in FIG. 1, but can also have a different makeup or configuration of internal components. FIG. 5A shows a configuration in which hinge 508 separates the upper part of the housing (502*a*) and the lower part of the housing (502*b*). The hinge 508 is open in this configuration, with the upper and lower parts of the housing (502*a*, 502*b*) forming a relatively flat surface over the entirety of the front side 512 of the communication device 100*d*. A portion of the front side 512 is covered by front display 184, which displays visual content 189 of a user interface, such as a communication window. FIG. 5B is a rear view of the example communication device 100*d*. FIG. 5B, like FIG. 5A, shows a configuration in which hinge 508 is open. However, FIG. 5B shows the back side 514 of the communication device 100*d* where back display 187 covers a portion of the upper part of the housing 502*a*. Back display 187 displays transcript 190 as visual content that is visible to a person within viewing range. Specific considerations for and adjustments in size of the font of presented transcript 190 can be made based on a distance of the inquisitive trusted person 117 to the device 100*d* or back display 187. FIG. 5C is a front rear view of the example communication device 100*d* in a closed position. In this configuration, the hinge 508 is closed, causing the upper part of the housing 502*a* to be flush with the lower part of the housing 502*b*, such that the upper and lower portions of back side 514 are exterior facing and visible and opposite each other while the upper and lower portions of front side 512 are adjacent each other and not visible. Back display 187 covers a portion of the upper part of the housing 502*a*, and displays visual content, such as time and date.

A communication exchange between communication device 100*d* and a second communication device can occur no matter the configuration of communication device 100*d*. FIGS. 5A and 5B depict configurations in which communication exchanges normally occur. FIG. 5C depicts a configuration more typically used for storage or transportation.

If transcript sharing mode is activated while a configuration depicted in FIGS. 5A and 5B is in use, the user 115 faces front display 184 while at least one image capturing device 168 having a field of view (FOV) encompassing a viewing range of the back display 187 detects the presence of inquisitive trusted person 117, and the transcript 190 is presented as visual content on the back display 187. If transcript sharing mode is activated while the configuration depicted in FIG. 5C is in use, the user 115 must manually open hinge 508 in order to orient and use the communication device as described in relation to the configurations depicted in FIGS. 5A and 5B. Alternatively, when transcript sharing mode is activated while the configuration depicted in FIG. 5C is in use, the user 115 may orient the folded communication device 100*d* such that back display 187 is right side up and position communication device 100*d* such that back display 187 faces trusted person 117, allowing at least one image capturing device 168 having a field of view (FOV) encompassing a viewing range of the back display 187 to detect the presence of inquisitive trusted person 117. Back display 187 may then present the transcript 190 as visual content. This embodiment can extend to situations in which the communication device 100*d* is partially opened and placed in a tent configuration on a supporting surface, such that the back display 187 and ICD 168 are facing the trusted person 117.

Transcript sharing mode, as described above in relation to FIGS. 5A and 5B, involves displaying a transcript on back display 187. However, alternate embodiments are contemplated where the user 115 faces back display 187 while at least one image capturing device 168 having a field of view (FOV) encompassing a viewing range of the front display 184 detects the presence of inquisitive trusted person 117. With these alternate embodiments, the transcript 190 is presented as visual content on the front display 184.

Figure 6:
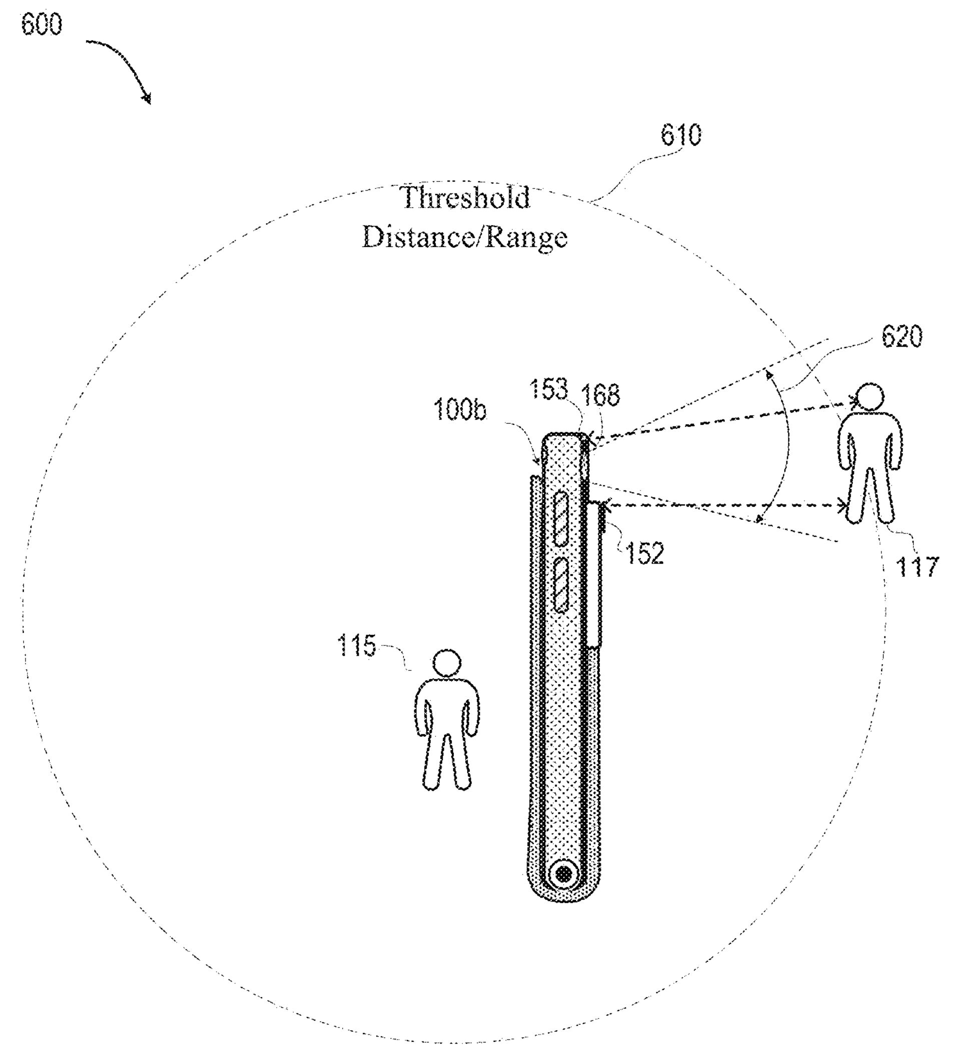
FIG. 6 depicts a schematic view illustrating a process whereby an electronic device determines whether proper conditions for dynamic call transcript surfacing for a communication exchange exist, according to multiple embodiments.

FIG. 6 is a schematic view illustrating a process 600 whereby an electronic device 100*b* determines whether proper conditions for dynamic call transcript surfacing for a communication exchange exist. The description of process 600 is provided with general reference to the specific components illustrated within the preceding FIGS. 1 and 3A-3F. Specific components referenced in process 500 may be identical or similar to components of the same name used in describing preceding FIGS. 1 and 3A-3F. In one or more embodiments, controller 120 (FIG. 1) configures communication device 100*b* (FIGS. 3A-3F) or a similar computing device to provide the described functionality of process 600. In the illustrative embodiment, during a communication exchange with another electronic device, a first user 115 of electronic device 100*b* is approached by a third party 117. When the third party 117 comes within a configurable threshold distance 510 of the electronic device 100*b* as measured by one or more proximity sensors 153, the controller 120 causes the electronic device 100*b* to determine whether the first electronic device is operating in a private environment. A private environment is an environment where only the user 115 of the electronic device 100*b* and persons authorized to be privy to the ongoing communication exchange are close enough to perceive and understand the ongoing communication exchange. The controller 120, to determine whether the electronic device is operating in a private environment, causes the electronic device 100*b* to capture, by at least one image capturing device 168, images of persons within the field of view (FOV) 620 of the at least one image capturing device 168, the FOV including an area within which faces of persons are visible and within a viewable range of the rear display 187. The controller 120 next determines whether these persons are trusted persons. A trusted person is designated as such via an assigned trusted contact stored with identifying information that includes at least an associated name and at least one identifying image stored in a trusted persons data base. The trusted persons data base can be stored within memory 154, at the first electronic communication device 100*b*, or in cloud storage or other local or remote storage accessible by first electronic communication device 100*b*. In one or more embodiments, a contact may be created as a trusted contact (e.g. family members that share a data plan with the user 115 of the first electronic communication device 100*b*). Alternatively, a contact can be designated as a trusted contact some time after being created, if user 115 develops a need to allow the contact to be privy to communication exchanges conducted by the first electronic communication device 100*b*. For example, a trusted contact could be a coworker assigned to a project that requires frequent communication with the user 115 and also necessitates that group members share with other group members the content of work-related communication exchanges made with their respective electronic communication devices. To determine whether a detected person is a real/live person, the controller 120 causes the electronic device 100*b* to detect via at least one depth sensor 153 three dimensionality of an object (e.g. a person) whose image is captured within the FOV of the at least one image capturing device 168, the depth sensor 153 being operative to check for depth using a hardware-based active depth perception sensing technology, such as one or more of a time of flight, structured light, or stereo depth perception sensing apparatus. The controller 120 (e.g. processor) then analyzes data received from the at least one depth sensor 153 to determine whether a preview image detected by the at least one image capturing device 168 is a face of a physical person. The processor 120 is configured to cause the electronic device 100*b* to differentiate between a still image, such as a photograph or portrait, and an actual physical person facing the display (e.g. back display 187) of the electronic device 100*b*. In response to determining that the detected third party 117 is a trusted person, the controller 120 causes the electronic device 110*b* to determine whether the trusted person is in an inquisitive mode relative to at least one of a first user 115 of the electronic device 100*b* and the communication exchange. Such determination can be made by assessing, via an AI module 157, the body language, facial expressions and other physical characteristics of third party 117, while assessing, via the proximity sensor 153, the length of time the trusted person spends loitering near the electronic device 100*b*. Upon determining that the third party 117 is a trusted person in an inquisitive mode, the controller 120 causes the electronic device to activate transcript sharing mode in which the third party 117 is presented a visual textual representation of the communication exchange via a display of the electronic device 100*b*.

The process of determining whether the first electronic device 100*b* is operating in a private environment is described above in relation to identifying the face of a trusted person. However, means of determining whether the first electronic device 100*b* is operating in a private environment related to the detection of other electronic devices are also contemplated. For example, in an exemplary embodiment, trusted persons may be respective users of a group of electronic, devices including the first electronic device 100*b*, that are linked (e.g. through a shared subscription plan) and equipped with an application which tracks the location of each device in the group, making the GPS coordinates of each device viewable by each member of the group. Alternatively, the presence of a cellular phone or similar device, (though not the identity of the user of such an electronic device), may be determined upon detection of radiofrequency signals typically transmitted from electronic communication devices, such as cellular, WiFi, Bluetooth® or GPS signals. Such detection can be confined to a building or part of a building or other access-controlled area by, for example, a geofence, a virtual geographical boundary enabled by GPS or RFID technology that enables software to trigger a response when an electronic communication device enters or leaves a defined area.

While the above illustrations were described in relation to electronic communication device 100*b*, any version of electronic communication device 100 (e.g., 100*a*, 100*b*, 100*c*, or 100*d*) can be configured to perform the functions as described above, or in a substantially similar matter, and is therefore contemplated for carrying out the functionality detailed above, without limitation.

Figure 7A:
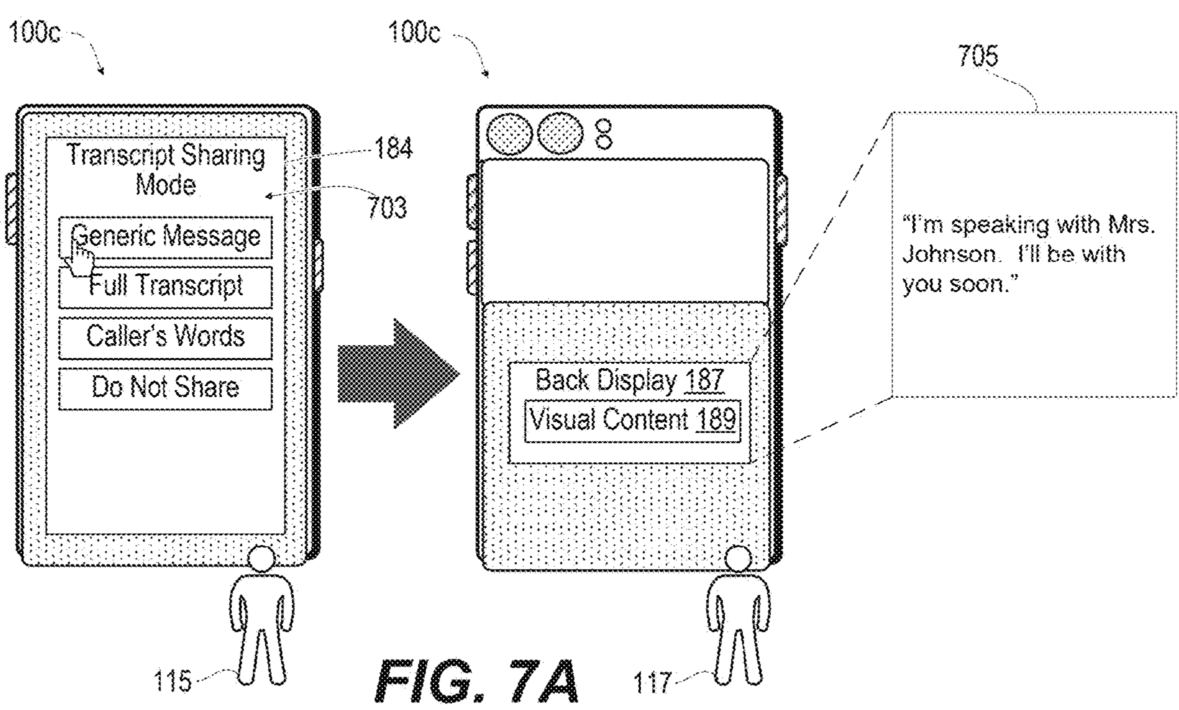
FIG. 7A illustrates an exemplary transcript sharing mode user interface whereby the user of the electronic device elects, from a number of possible options, to share a generic response to an interested trusted person, according to an embodiment of the present innovation.
Figure 7B:
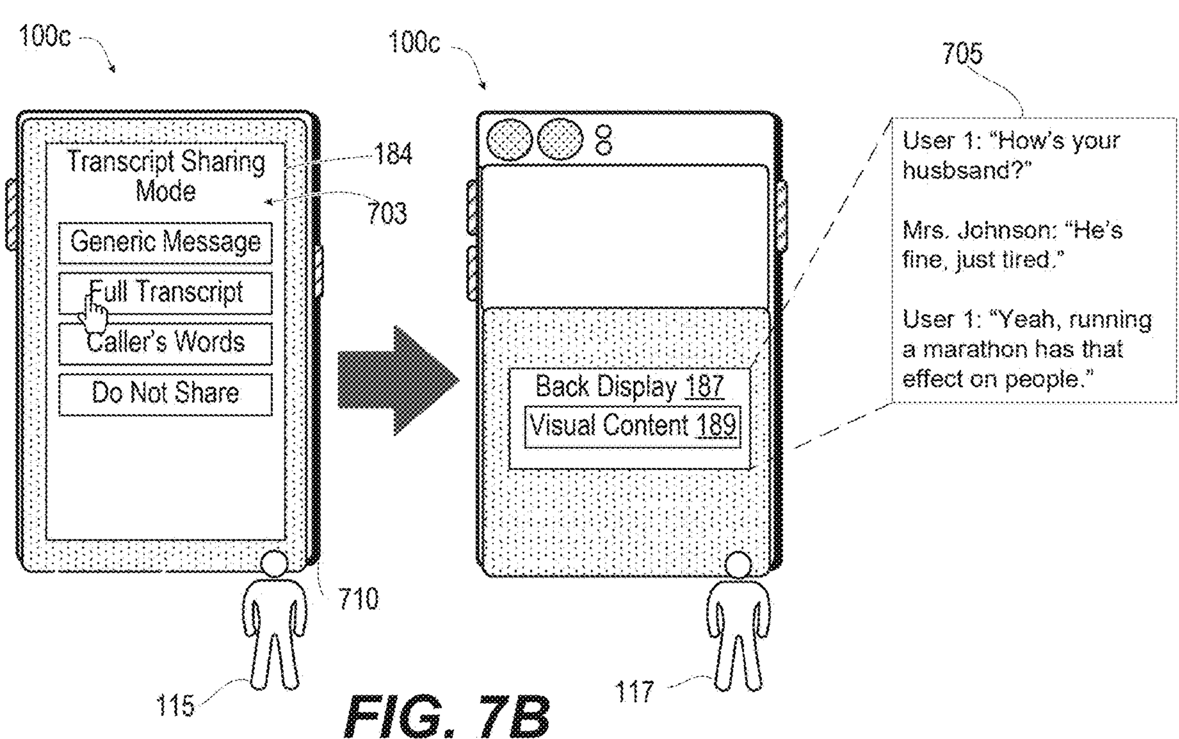
FIG. 7B illustrates an exemplary transcript sharing mode user interface whereby the user of the electronic device elects, from a number of possible options, to share a full transcript of a communication exchange to an interested trusted person, according to an embodiment of the present innovation.

FIGS. 7A-7B depict electing between a number of possible options offered by an exemplary transcript sharing mode (TSM) user interface the manner in which an inquisitive third party 117 is addressed by the user 115 of an electronic device 100*c* during a pre-existing communication exchange. According to one or more embodiments, myriad response options exist. All iterations of the present innovation contemplate surfacing text at a first display (e.g. back display 187) on a first surface of the electronic device 100*c* which faces a trusted third party 117. In the exemplary embodiment, a second display (e.g. front display 184) is incorporated into the second surface facing the user 115, wherein the processor 120 is further configured to cause the electronic device 100*c* to activate a transcript sharing mode by generating and presenting, via the second display 184, a selectable activation option for receiving user approval prior to the surfacing of the transcript 190 on the first display 187.

In at least one embodiment, response options presented to the user 115 of the electronic device 100*c* at the display 184 include electing to surface a generic message, presenting a full transcript 190 of the communication exchange, presenting only part of the conversation provided by the user of the second device (Caller's Words), and an option not to share (Do Not Share). In FIG. 7A, the user 115 elects to offer a generic response. Thus, the visual content 189, shown to the trusted third party 117 on the back display 187, comprises text 605 that simply indicates who the user 115 is speaking with and that the user 115 is unable to speak with the trusted third party 117 at present. In FIG. 7B, the user 115 elects to surface the communication exchange in its entirety. Thus, the visual content 189, shown to the trusted third party 117 on the back display 187, comprises text 705 that coveys every word spoken by both participants in the communication exchange. If a user elected instead to surface "Caller's Words" (e.g. the half of the communication exchange provided by the user of the second electronic device) processor 120 would cause the electronic device 100*c* to generate and present a transcript 190 comprising a verbatim textual representation of words spoken by a user of the second electronic device during the communication exchange at back display 187. Where the user elects to offer no response (Do Not Share), no text would be surfaced at back display 187. Other responses are also available. One such option, a general summary, occurs when the controller 120 causes the electronic device 100*c* to activate a dedicated artificial intelligence (AI) module 157 that generates and presents a transcript 190 comprising a summary, generated by the AI module 157, of a context associated with words spoken by both a user of the second electronic device and the user 115 of the electronic device 100*c* during the communication exchange.

Figure 8:
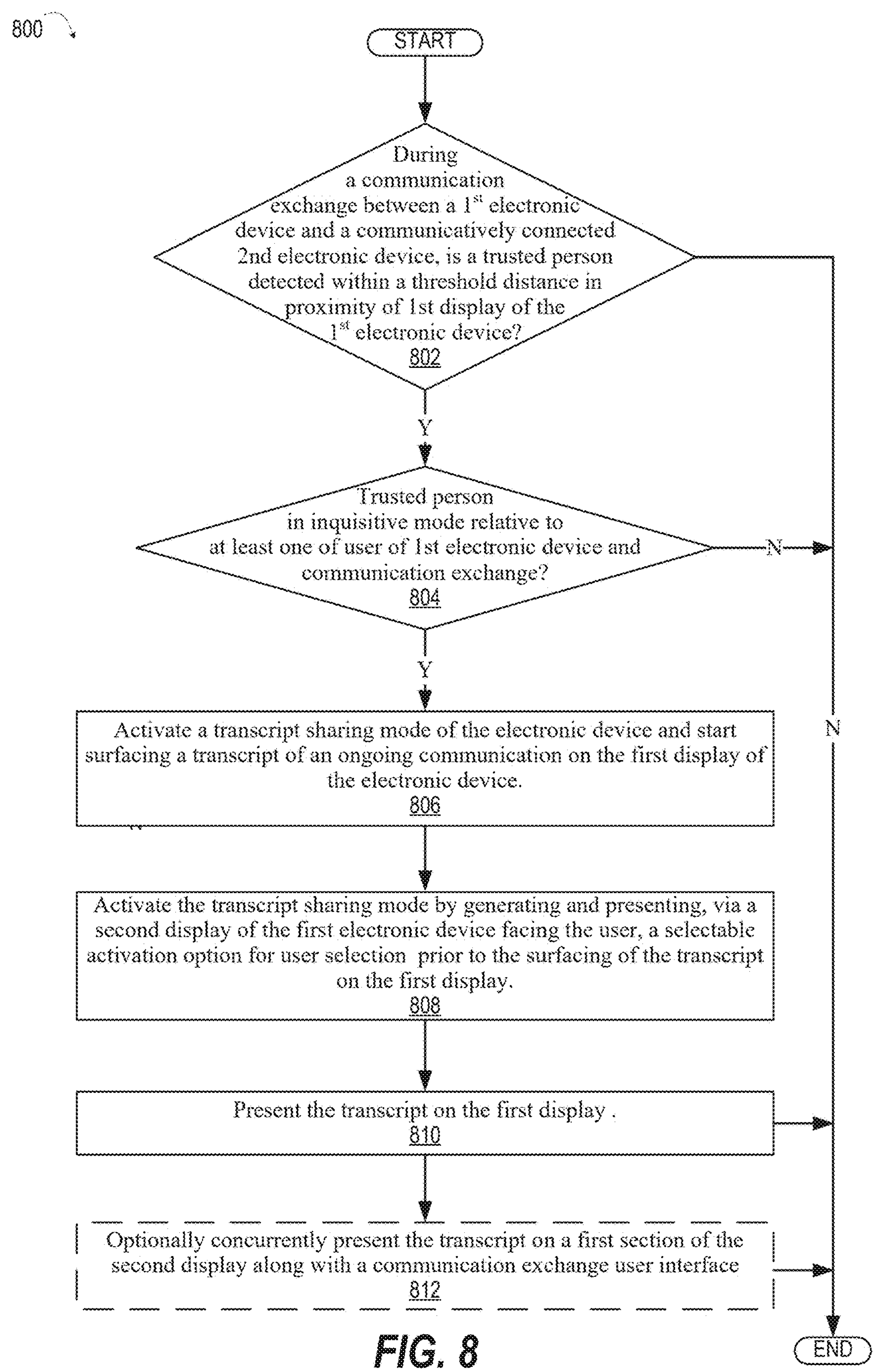
FIG. 8 is a flow diagram presenting a method for surfacing a transcript of an ongoing communication exchange between a first electronic device and a communicatively connected second electronic device when an inquisitive trusted person is detected in proximity of a first display of the first electronic device, according to one or more embodiments.

FIG. 8 is a flow diagram presenting method 800 of a method for dynamic call transcript surfacing of an ongoing communication exchange between a first electronic device and a communicatively connected second electronic device. The descriptions of method 800 (FIG. 8) are provided with general reference to the specific components illustrated within the preceding FIGS. 1, 2A-2F, 3A-3F, 4A-4F, 5A-5B, 6, and 7A-7B. Specific components referenced in method 800 (FIG. 8) may be identical or similar to components of the same name used in describing preceding FIGS. 1, 2A-2F, 3A-3F, 4A-4F, 5A-5B, 6, and 7A-7B. In one or more embodiments, controller 120 (FIG. 1) configures a corresponding one of communication device 100 (FIG. 1), communication device 100*a* (FIG. 2A), communication device 100*b* (FIG. 3A), communication device 100*c* (FIG. 4A), or a similar computing device to provide the described functionality of method 800 (FIG. 8).

With reference to FIG. 8, in one or more embodiments, method 800 is presented for surfacing dynamic call transcripts via an electronic device having an adaptable display. Method 800 includes during a communication exchange between a first electronic device 100 and a communicatively connected second electronic device, determining whether a trusted person 117 is detected within a threshold distance in proximity of a first display of the first electronic device 100 (block 802). If the conditions of block 802 are not met, the method ends. If the conditions of block 802 are met, method 800 includes determining whether the trusted person 117 is in an inquisitive mode relative to at least one of a user 115 of the first electronic device 100 and the communication exchange (block 804). A trusted person may be determined to be inquisitive in a number of ways. For example, the trusted person 117 could verbally address the user 115 using certain keywords that when analyzed by an AI module 157 are taken to indicate an inquisitive disposition regarding the communication exchange. Additionally, images of the facial expressions of the trusted person 117 can be captured within the FOV of an image capturing device 168, where the FOV includes an area within a viewable range of back display 187. AI module 157 can then perform an analysis of the image, comparing it with stored facial expression analysis data to determine/identify an inquisitive disposition regarding the communication exchange. Additionally, continuous detection of the trusted person 117 by a proximity sensor of the electronic device 100 for longer than a configurable threshold can also be taken to indicate an inquisitive disposition regarding the communication exchange. If the conditions of block 804 are not met, the method ends. If the conditions of block 804 are met, method 800 includes activating a transcript sharing mode of the first electronic device 100 and starting surfacing of a transcript 190 of an ongoing communication on the first display of the first electronic device 100 (block 806). As an example, the transcript 190 can be generated and rendered for presenting on back display 187 (FIGS. 2-7). In some embodiments, where a rollable or scrollable display can selectively be extended around an edge of the device to present the back display 187, the method may include triggering the translation mechanism of the device to move/translate the display such that a back portion of the display is provided and on which the transcript 190 is presented. In some embodiments, prior to surfacing a transcript 190 on the first display, method 800 may include activating the transcript sharing mode by generating and presenting, via a second display (e.g., the front display 184) of the first electronic device 100 facing the user 115, selectable activation option(s) for user selection (block 808). FIGS. 7A-7B present examples of these options. After the completion of block 808, method 800 includes presenting the transcript 190 on the first display (block 810). Method 800 can optionally include concurrently presenting the transcript 190 on a first section of the second display along with a communication exchange user interface 703 (block 812). Then, method ends.

In one or more embodiments, method 800 further comprises, in determining whether the electronic device **100*b* is operating in a private environment: capturing, by the image capturing device 168, images of persons within the FOV 620 that are in a viewable range of the first display 187; comparing the images to stored images of trusted persons; and initiating a surfacing of the transcript 190** only when every person identified within the viewable range is a trusted person.

In a further embodiment, method 800 further comprises: determining, via at least one depth sensor 152, a three dimensionality of an object whose image is captured within the FOV 520 of the at least one image capturing device 168, the depth sensor 152 being operative to check for depth using a hardware-based active depth perception sensing technology; and analyzing data received from the at least one depth sensor 152 to determine whether a preview image detected by the at least one image capturing device 168 is a face of a physical person, where the at least one processor 120 is configured to cause the electronic device **100*b* to differentiate between a still image and an actual physical person facing the first display 187 of the electronic device 100*b*** and to activate transcript sharing mode only in response to the detected object being an actual physical person.

In one or more embodiments, method 800 further comprises: generating and presenting the transcript 190 comprising a verbatim written representation of words spoken by a user of the second electronic device during the communication exchange.

In one or more embodiments, method 800 further comprises: generating, by a dedicated artificial intelligence (AI) module 157, the transcript 190 comprising a summary of a context associated with words spoken by both a user of the second electronic device and the user 115 of the first electronic device 100 during the communication exchange.

Accordingly, by implementing the above-described processes, a user of an electronic communication device engaging in a communication exchange with the user of another electronic communication device may convey the content of the communication exchange to a trusted third party in close proximity. Such conveyance is enabled by sensors operative to determine that the user and the third party are alone and verify that the third party is an actual real (3-dimensional) person authorized to be privy to the contents of the communication exchange, not merely a 2-dimensional likeness of a trusted person. Such conveyance is made on a portion of the electronic device facing the trusted third party so as not to interrupt the communication exchange. The portion of the device viewed by the third party is a flexible display screen adapted to conform to a housing that scrolls, rolls, extends, or otherwise morphs as intended by the user of the first electronic communication device. The described methods thus provide an improvement in existing technology for communicating pertinent information to third parties without pausing, interrupting, or otherwise compromising an ongoing communication exchange with a second party.

In the above-described methods, one or more of the method processes may be embodied in a computer readable device containing computer readable code such that operations are performed when the computer readable code is executed on a computing device. In some implementations, certain operations of the methods may be combined, performed simultaneously, performed in a different order, or omitted, without deviating from the scope of the disclosure. Further, additional operations may be performed, including operations described in other methods. Thus, while the method operations are described and illustrated in a particular sequence, use of a specific sequence of operations is not meant to imply any limitations on the disclosure. Changes may be made with regards to the sequence of operations without departing from the spirit or scope of the present innovation. Use of a particular sequence is therefore, not to be taken in a limiting sense, and the scope of the present disclosure is defined primarily by the appended claims.

Aspects of the present innovation are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present innovation may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the innovation. The described embodiments were chosen and described in order to best explain the principles of the disclosure and their practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the innovation has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

an enclosure comprising a first surface and a second surface opposed to the first surface;

a communications subsystem comprising at least one interface by which the electronic device communicatively connects via a wireless connection to a second electronic device to enable a user of the electronic device to engage in a communication exchange with a second user of the second electronic device;

at least one display comprising a first display incorporated into the first surface, and oriented to be outward facing, away from the user of the electronic device while the user is engaged in the communication exchange, the electronic device to selectively generate and present call transcripts on the first display;

at least one image capturing device having a field of view (FOV) in viewing range of the first display;

and at least one processor communicatively coupled to the communication subsystem, the first display, and the image capturing device, the at least one processor executing program code, and configured to cause the electronic device to:

during the communication exchange, determine whether a trusted person is detected within a threshold distance in proximity of the first display of the electronic device;

in response to detecting a trusted person within the threshold distance, determine whether the trusted person is in an inquisitive mode relative to at least one of a first user of the electronic device and the communication exchange; and in response to determining that the detected trusted person is within the threshold distance and in an inquisitive mode, activate a transcript sharing mode of the electronic device and start surfacing a transcript of an ongoing communication on the first display of the electronic device.

2. The electronic device of claim 1, wherein the at least one processor is further configured to cause the electronic device to:

determine whether the first electronic device is operating in a private environment; and initiate the presenting of the transcript on the first display only if the first electronic device is operating in a private environment.

3. The electronic device of claim 2, wherein to determine whether the electronic device is operating in a private environment, the processor causes the electronic device to:

capture, by the image capturing device, images of persons within the FOV, the FOV including an area within which faces of persons are visible in a viewable range of the first display;

compare the images to stored images of trusted persons; and initiate a surfacing of the transcript only when every person identified within the viewable range is a trusted person.

4. The electronic device of claim 3, wherein each trusted person is pre-designated as such via an assigned trusted contact stored with identifying information comprising at least an associated name and at least one identifying image.

5. The electronic device of claim 1, further comprising:

a second display, incorporated into the second surface of the enclosure, and oriented towards the user of the first electronic device while the user is engaged in the communication exchange;

a microphone that enables capture of audible input for the communication exchange; and an audio output system that enables receipt by the user of audio from the communication exchange.

6. The electronic device of claim 5, further comprising:

at least one depth sensor that enables detection of three dimensionality of an object whose image is captured within the FOV of the at least one image capturing device, the depth sensor being operative to check for depth using a hardware-based active depth perception sensing technology;

wherein the at least one processor analyzes data received from the at least one depth sensor to determine whether a preview image detected by the at least one image capturing device is a face of a physical person, wherein the at least one processor is configured to cause the electronic device to differentiate between a still image and an actual physical person facing the first display of the electronic device and to activate transcript sharing mode only in response to the detected object being an actual physical person.

7. The electronic device of claim 5, wherein the at least one processor is configured to cause the electronic device to:
present the transcript on the first display; and
concurrently present the transcript on a first section of the second display along with a communication exchange user interface.

8. The electronic device of claim 1, further comprising a second display incorporated into the second surface facing the user, wherein the at least one processor is further configured to cause the electronic device to activate the transcript sharing mode by generating and presenting, via the second display, a selectable activation option for receiving user approval prior to the surfacing of the transcript on the first display.

9. The electronic device of claim 1, wherein the at least one processor is further configured to cause the electronic device to generate and present the transcript comprising a verbatim textual representation of words spoken by a user of the second electronic device during the communication exchange.

10. The electronic device of claim 1, wherein the at least one processor is further configured to cause the electronic device activate a dedicated artificial intelligence (AI) module that generates and presents the transcript comprising a summary, generated by the AI module, of a context associated with words spoken by both a user of the second electronic device and the user of the electronic device during the communication exchange.

11. A method comprising:
during a communication exchange between a first electronic device and a communicatively connected second electronic device, determining, by a processor of the first electronic device, whether a trusted person is detected within a threshold distance in proximity of a first display of the first electronic device, the first electronic device comprising:
an enclosure comprising a first surface and a second surface opposed to the first surface;
a communications subsystem comprising at least one interface by which the first electronic device communicatively connects via a wireless connection to the second electronic device to enable a user of the first electronic device to engage in a communication exchange with a second user of the second electronic device;
at least one display comprising a first display incorporated into the first surface, and oriented to be outward facing, away from the user of the electronic device while the user is engaged in the communication exchange, the electronic device to selectively generate and present call transcripts on the first display; and
at least one image capturing device having a field of view (FOV) in viewing range of the first display;
in response to detecting a trusted person within the threshold distance, determining whether the trusted person is in an inquisitive mode relative to at least one of a user of the first electronic device and the communication exchange; and
in response to determining that the trusted person is in an inquisitive mode, activating a transcript sharing mode of the first electronic device and surfacing a transcript of an ongoing communication on the first display of the first electronic device.

12. The method of claim 11, wherein, in determining whether the electronic device is operating in a private environment, the method further comprises:
capturing, by an image capturing device, images of persons within an FOV that are in a viewable range of the first display;
comparing the images to stored images of trusted persons; and
initiating a surfacing of the transcript only when every person identified within the viewable range is a trusted person.

13. The method of claim 12, further comprising:
determining, via at least one depth sensor, a three dimensionality of an object whose image is captured within the FOV of the image capturing device, the depth sensor being operative to check for depth using a hardware-based active depth perception sensing technology; and
analyzing data received from the at least one depth sensor to determine whether a preview image detected by the at least one image capturing device is a face of a physical person, wherein a processor is configured to cause the first electronic device to differentiate between a still image and an actual physical person facing the first display of the first electronic device and to activate transcript sharing mode only in response to the detected object being an actual physical person.

14. The method of claim 11, further comprising: activating the transcript sharing mode by generating and presenting, via a second display of the first electronic device facing the user, a selectable activation option for user selection prior to the surfacing of the transcript on the first display.

15. The method of claim 14, further comprising:
presenting the transcript on the first display; and
concurrently presenting the transcript on a first section of the second display along with a communication exchange user interface.

16. The method of claim 11, further comprising generating and presenting the transcript comprising a verbatim written representation of words spoken by a user of the second electronic device during the communication exchange.

17. The method of claim 11, further comprising generating, by a dedicated artificial intelligence (AI) module, the transcript comprising a summary of a context associated with words spoken by both a user of the second electronic device and the user of the first electronic device during the communication exchange.

18. A computer program product comprising a non-transitory computer readable medium having program instructions that when executed by a processor of a first electronic device that comprises an interface that enables the first electronic device to communicatively connect via a wireless connection to a second electronic device to effect a communication exchange, configure the first electronic device to perform functions comprising:
during a communication exchange between the first electronic device and a communicatively connected second electronic device, determining whether a trusted person is detected within a threshold distance in proximity of a first display of the first electronic device, the first electronic device comprising:
an enclosure comprising a first surface and a second surface opposed to the first surface;
a communications subsystem comprising the interface by which the first electronic device communicatively connects via the wireless connection to the second electronic device to enable a user of the first electronic device to engage in the communication exchange with a second user of the second electronic device;

a first display incorporated into the first surface, and oriented to be outward facing, away from the user of the electronic device while the user is engaged in the communication exchange, the electronic device to selectively generate and present call transcripts on the first display; and at least one image capturing device having a field of view (FOV) in viewing range of the first display;

in response to detecting a trusted person within the threshold distance, determining whether the trusted person is in an inquisitive mode relative to at least one of a first user of the first electronic device and the communication exchange; and in response to determining that the trusted person is in an inquisitive mode, activating a transcript sharing mode of the first electronic device and surfacing a transcript of an ongoing communication on the first display of the first electronic device.

19. The computer program product of claim 18, further comprising program instructions for, in determining whether the first electronic device is operating in a private environment:

capturing, by an image capturing device, images of persons within an FOV that are in a viewable range of the first display;

comparing the images to stored images of trusted persons; and initiating a surfacing of the transcript only when every person identified within the viewable range is a trusted person.

20. The computer program product of claim 19, further comprising program instructions for:

determining, via at least one depth sensor, a three dimensionality of an object whose image is captured within the FOV of the image capturing device; and analyzing data received from the at least one depth sensor to determine whether a preview image detected by the at least one image capturing device is a face of a physical person, wherein the at least one processor is configured to cause the first electronic device to differentiate between a still image and an actual physical person facing the first display of the first electronic device and to activate transcript sharing mode only in response to the detected object being an actual physical person.

* * * * *